(12) United States Patent
Gudlavenkatasiva et al.

(10) Patent No.: US 9,317,670 B2
(45) Date of Patent: Apr. 19, 2016

(54) SECURITY BASED ON USAGE ACTIVITY ASSOCIATED WITH USER DEVICE

(75) Inventors: Bhaskar R. Gudlavenkatasiva, Tampa, FL (US); Nityanand Sharma, Tampa, FL (US); Ashraf Yussouff, Tampa, FL (US); Premanand Sivakkolundhu, Tampa, FL (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 652 days.

(21) Appl. No.: 13/477,207

(22) Filed: May 22, 2012

(65) Prior Publication Data

US 2013/0318580 A1 Nov. 28, 2013

(51) Int. Cl.
| | | |
|---|---|---|
| *H04L 9/32* | (2006.01) | |
| *G06F 21/31* | (2013.01) | |
| *H04L 29/06* | (2006.01) | |
| *G06F 21/32* | (2013.01) | |
| *G06F 21/35* | (2013.01) | |
| *G06F 21/34* | (2013.01) | |
| *G06F 21/00* | (2013.01) | |
| *G06F 21/44* | (2013.01) | |
| *G06F 21/33* | (2013.01) | |
| *G06F 21/36* | (2013.01) | |

(52) U.S. Cl.
CPC ............... *G06F 21/31* (2013.01); *H04L 63/08* (2013.01); *H04L 63/168* (2013.01); *G06F 21/00* (2013.01); *G06F 21/313* (2013.01); *G06F 21/32* (2013.01); *G06F 21/33* (2013.01); *G06F 21/34* (2013.01); *G06F 21/35* (2013.01); *G06F 21/36* (2013.01); *G06F 21/44* (2013.01); *G06F 2221/2101* (2013.01); *G06F 2221/2103* (2013.01)

(58) Field of Classification Search
None
See application file for complete search history.

(56) References Cited

U.S. PATENT DOCUMENTS

| | | | | |
|---|---|---|---|---|
| 4,621,334 | A * | 11/1986 | Garcia | 382/115 |
| 5,991,882 | A * | 11/1999 | O'Connell | 726/18 |
| 7,949,716 | B2 * | 5/2011 | Alperovitch et al. | 709/206 |
| 8,332,932 | B2 * | 12/2012 | Kellas-Dicks et al. | 726/18 |
| 8,925,053 | B1 * | 12/2014 | Mehta | G06F 21/31 713/155 |
| 2002/0073339 | A1 * | 6/2002 | Card | 713/201 |
| 2002/0147914 | A1 * | 10/2002 | Arnold | 713/186 |
| 2003/0154406 | A1 * | 8/2003 | Honarvar | G06Q 10/10 726/10 |

(Continued)

OTHER PUBLICATIONS

Babic (Babic et al., "Bulding Robust Authentication Systems With Activity-Based Personal Questions", SafeConfig'09, Nov. 2009, ACM 978-1-60558-778—Mar. 9, 2011).*

*Primary Examiner* — Peter Poltorak

(57) ABSTRACT

A method includes receiving usage data associated with a user device. The usage data includes information based on at least one usage activity associated with one or more applications on the user device. The method may also include analyzing the usage data based on predetermined criteria and determining a security question and a corresponding answer based on the usage data. The security question and the corresponding answer are stored in an associated database. The method further includes providing the security question and the corresponding answer in response to a request for the security question and the corresponding answer. Access is provided to a system based on an input of the corresponding answer in response to the security question.

20 Claims, 10 Drawing Sheets

(56) References Cited

U.S. PATENT DOCUMENTS

| | | | |
|---|---|---|---|
| 2003/0212806 A1* | 11/2003 | Mowers et al. | 709/229 |
| 2004/0059950 A1* | 3/2004 | Bender et al. | 713/202 |
| 2004/0215574 A1* | 10/2004 | Michelsen | G06Q 20/04 705/64 |
| 2005/0021649 A1* | 1/2005 | Goodman et al. | 709/207 |
| 2005/0039057 A1* | 2/2005 | Bagga | G06F 21/40 726/19 |
| 2005/0081044 A1* | 4/2005 | Giles et al. | 713/182 |
| 2005/0097320 A1* | 5/2005 | Golan et al. | 713/166 |
| 2005/0159998 A1* | 7/2005 | Buyukkokten et al. | 705/11 |
| 2006/0037073 A1* | 2/2006 | Juels | G06F 21/31 726/17 |
| 2008/0039121 A1* | 2/2008 | Muller et al. | 455/456.3 |
| 2008/0109894 A1* | 5/2008 | Smithson | 726/18 |
| 2008/0134317 A1* | 6/2008 | Boss | G06F 21/31 726/18 |
| 2008/0141366 A1* | 6/2008 | Cross et al. | 726/21 |
| 2008/0146193 A1* | 6/2008 | Bentley et al. | 455/411 |
| 2009/0187962 A1* | 7/2009 | Brenneman et al. | 726/1 |
| 2009/0276839 A1* | 11/2009 | Peneder | G06F 21/40 726/8 |
| 2009/0300739 A1* | 12/2009 | Nice et al. | 726/6 |
| 2010/0122340 A1* | 5/2010 | Chow et al. | 726/18 |
| 2011/0131282 A1* | 6/2011 | Kraft et al. | 709/206 |
| 2013/0067217 A1* | 3/2013 | Matzkel | G06F 21/41 713/155 |
| 2013/0144786 A1* | 6/2013 | Tong | G06Q 20/4014 705/44 |
| 2013/0305329 A1* | 11/2013 | Zhang | G06F 21/00 726/6 |
| 2015/0161375 A1* | 6/2015 | Ghosh | G06F 21/36 726/7 |

* cited by examiner

SECURITY BASED ON USAGE ACTIVITY ASSOCIATED WITH USER DEVICE

BACKGROUND INFORMATION

Cell phones and tablets are consumer electronic devices that are often associated with a single user. These devices may include touch displays with which the user may input information to the cell phone or tablet. The touch display may protect access to the user device with a security feature, such as a required password. Also, these consumer devices are becoming an integral part of many users' day to day life and are used to perform a large number of activities.

DETAILED DESCRIPTION OF PREFERRED EMBODIMENTS

The following detailed description refers to the accompanying drawings. The same reference numbers in different drawings identify the same or similar elements.

Embodiments described herein relate to devices, methods, and systems for providing adaptive security questions associated with a user device. Usage activities performed on user devices may be analyzed to identify patterns and extract data sets for further use. An implementation described herein may relate to providing an ability to identify predetermined activities performed in association with the user device and using that information to generate context based security questions or authentication challenges for users to access the user devices, e.g., to unlock a touch screen of the user device. Additionally, service provider network information associated with the user device may be used to generate authentication challenge questions.

Figure 1:
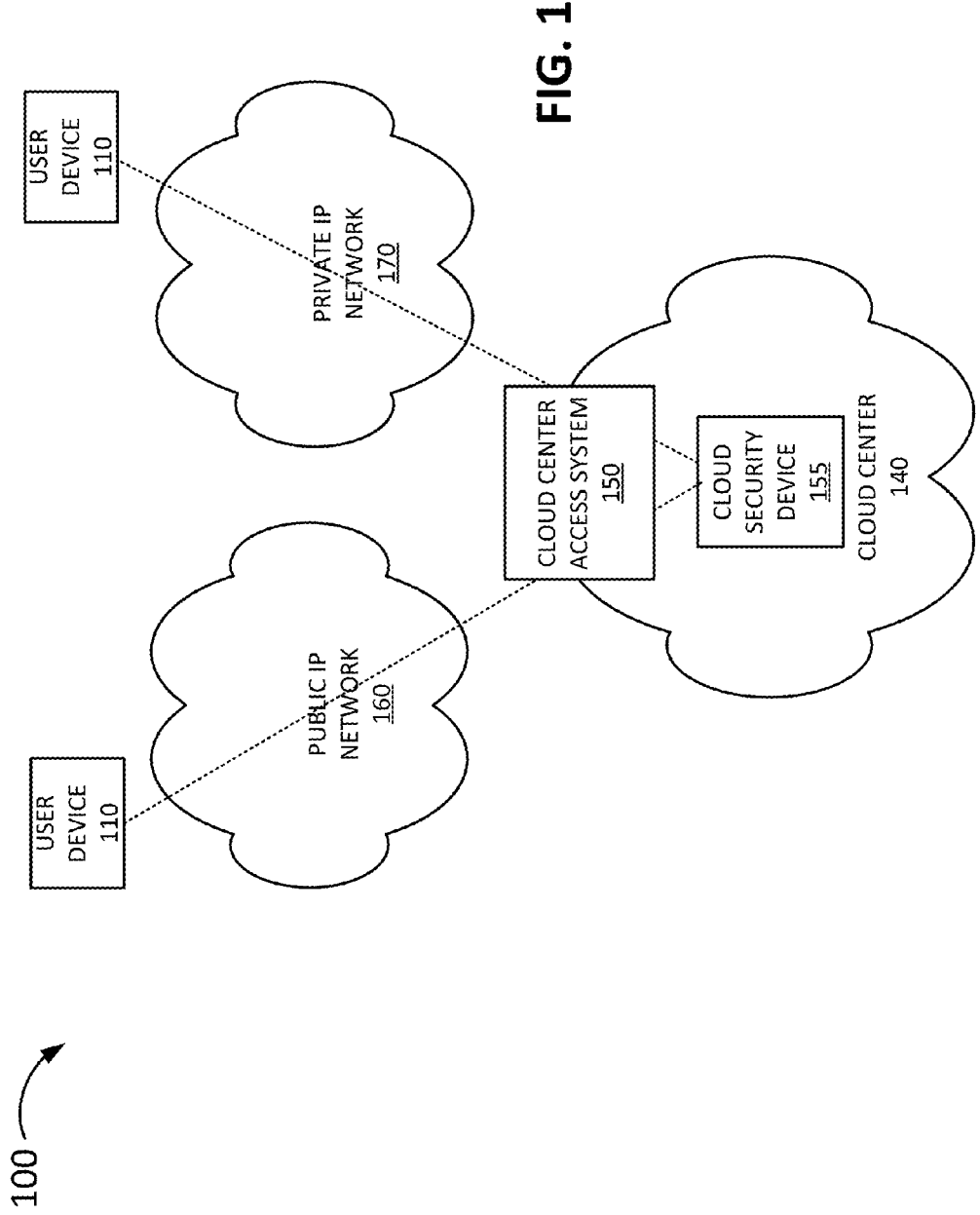
FIG. 1 is a diagram illustrating a first exemplary environment according to an implementation described herein.

FIG. 1 is a diagram of an environment 100 in which the systems and/or methods described herein may be implemented. As shown in FIG. 1A, environment 100 may include user devices 110, a cloud center 140, a cloud center access system 150, a cloud security device 155, a public Internet protocol (IP) network 160, and a private IP network 170. While FIG. 1 shows two user devices 110, a single cloud center 140, a single cloud center access system 150, a single cloud security device 155, a single public IP network 160, and a single private IP network 170 for illustrative purposes, in practice, environment 100 may include additional user devices 110, multiple cloud centers 140, multiple cloud center access systems 150, multiple cloud security devices 155, multiple public IP network 160, or multiple private IP networks 170.

User devices 110 may enable a user to view video content or interact with another user device 110 or a video display device (e.g., a set-top box and/or television). User devices 110 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

Cloud center 140 may include one or more server devices and/or storage devices, which provide cloud services for customers. The one or more server devices and/or storage devices may connect to cloud center access system 150 with a connection, such as a Layer 2 connection or a Layer 3 connection. Cloud services provided by cloud center 140 may include, for example, computing as a service, cloud storage, cloud based support for adaptive security associated with user devices 110 as described below, a hosted voice-over-Internet Protocol (VoIP) service, a Network Address Translation (NAT) service, a Virtual Private Network (VPN) service, a Distributed Denial of Service (DDOS) detection and/or mitigation service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that be provided by a cloud center.

Cloud center 140 may include a cloud security device 155. While FIG. 1 illustrates a single cloud security device 155 for illustrative purposes, in practice, cloud center 140 may include multiple cloud security devices 155. Cloud security device 155 may include one or more devices that provide one or more security services for user devices 110. For example, cloud security device 155 may form a repository for adaptive security information associated with user device 110, as described below.

Cloud center access system 150 may include one or more devices that connect cloud center 140 to public IP network 160, and/or to private IP network 170.

Public IP network 160 may include a public IP packet-switched network, a circuit-switched network, or a combination thereof. For example, public IP network 160 may include a local area network (LAN), a wide area network (WAN), a metropolitan area network (MAN), an ad hoc network, an intranet, a fiber optic-based network (e.g., a fiber optic service network), a wireless network (e.g., a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof), and/or a combination of these or other types of networks.

Private IP network 170 may include a private IP packet-switched network, a private circuit-switched network, a wireless network, or a combination thereof.

Figure 2:
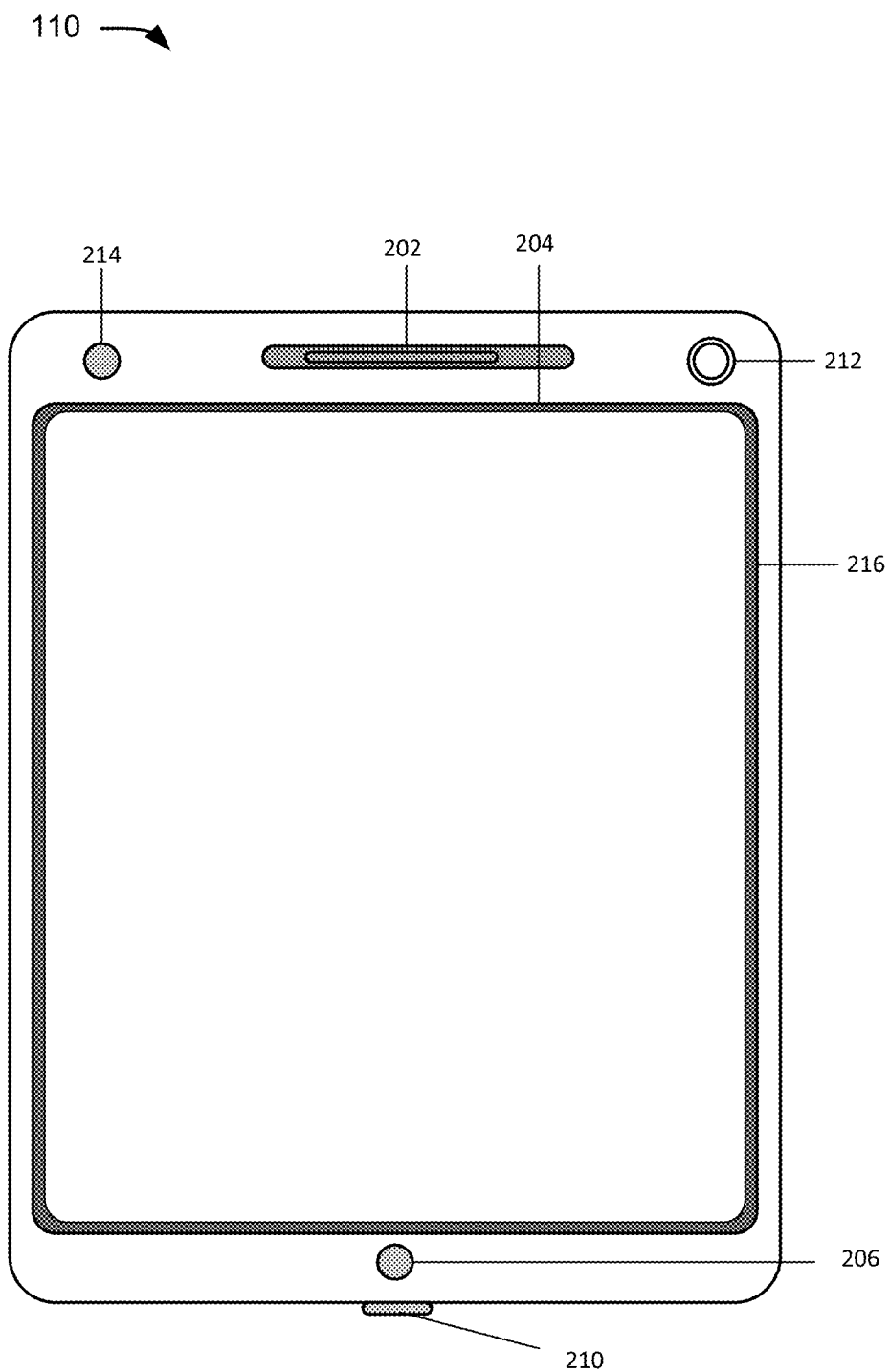
FIG. 2 is a diagram of an exemplary device in which methods and systems described herein may be implemented.

FIG. 2 is a diagram of an exemplary user device 110 in which methods and systems described herein may be implemented. Although illustrated as a tablet or touch screen device, user device 110 may include any of the following devices: an electronic notepad, a tablet computer, a laptop, and/or a personal computer; a personal digital assistant (PDA) that can include a telephone; a mobile telephone; a smart phone; a cellular phone; a personal communications system (PCS) terminal that may combine a cellular radiotelephone with data processing, facsimile, and/or data communications capabilities; a gaming device or console; a peripheral (e.g., wireless headphone); a digital camera; or another type of computational or communication device.

In this implementation, user device 110 may take the form of a tablet computer. As shown in FIG. 2, user device 110 may include a speaker 202, a touchscreen display 204, control button 206, a microphone 210, sensors 212, a front camera 214, and a housing 216. Although user device 110 is shown with particular components and a particular configuration, user device 110 may include fewer, more or different components, such as additional sensors, input devices, and may include associated devices (e.g., a stylus) etc.

Speaker 202 may provide audible information to a user of user device 110.

Display 204 may provide visual information to the user, such as an image of a caller, video images, or pictures. In addition, display 204 may include a touchscreen for providing input to device 110. Display 204 may provide hardware/software to detect the coordinates of an area that is touched by a user. For example, display 204 may include a display panel, such as a liquid crystal display (LCD), organic light-emitting diode (OLED) display, and/or another type of display that is capable of providing images to a viewer. Display 204 may include a transparent panel/surface for locating the position of a finger or an object (e.g., stylus) when the finger/object is touching or is close to display 204.

Control button 206 may permit the user to interact with user device 110 to cause user device 110 to perform one or more operations, such as place or receive a telephone call, input data to user device 110, manipulate user interface elements, etc. In some implementations, control button 206 may include a telephone keypad (not shown) or an alphanumeric keyboard. Microphone 210 may receive audible information from the user. Sensors 212 may collect and provide, to device 110, information (e.g., acoustic, infrared, etc.) that is used to aid the user in capturing images or in providing other types of information (e.g., a distance between a user and user device 110). Front camera 214 may enable a user to view, capture and store images (e.g., pictures, video clips) of a subject in front of user device 110. Housing 216 may provide a casing for components of user device 110 and may protect the components from outside elements.

Figure 3:
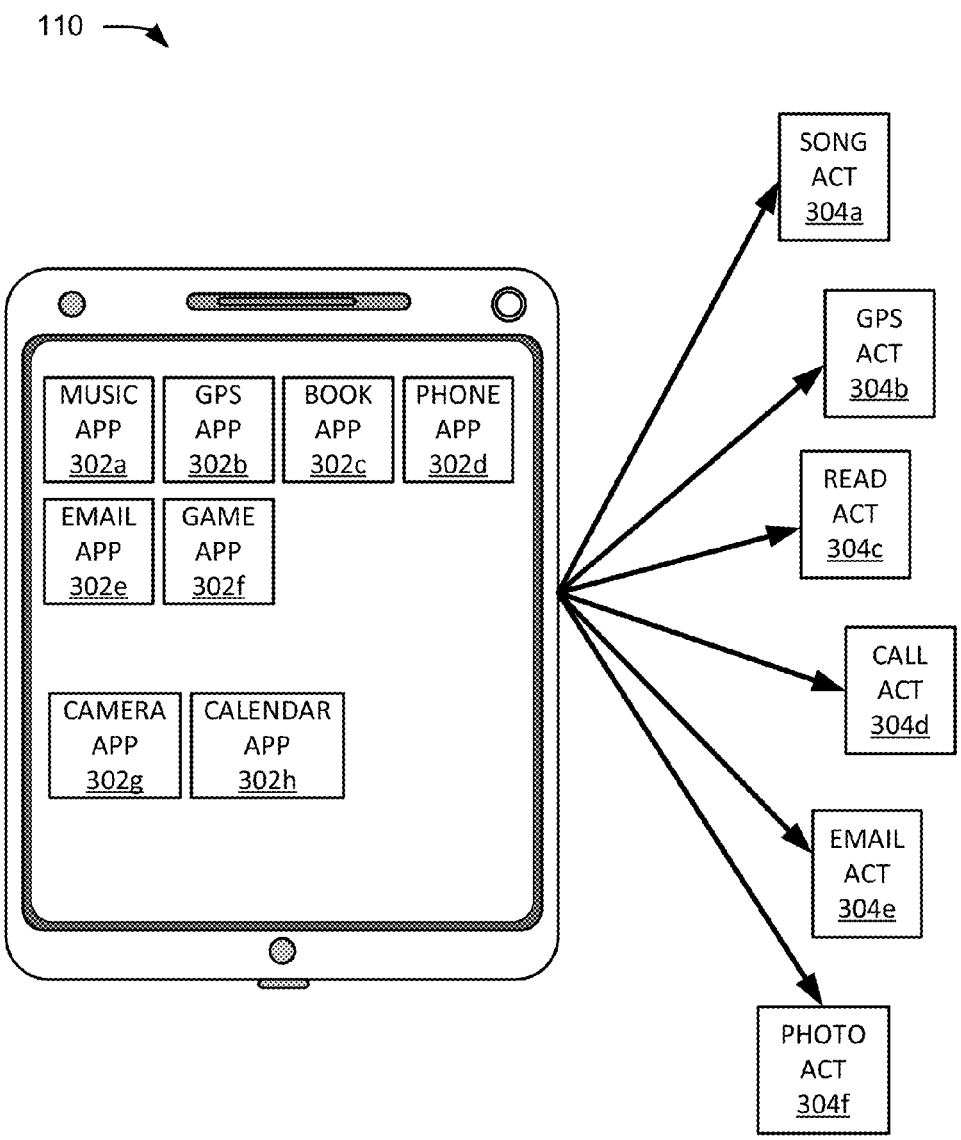
FIG. 3 is a diagram of an exemplary device and associated applications and activities.

FIG. 3 illustrates an implementation of user device 110 that includes associated applications (Apps) 302a-302h (i.e., machine readable instructions) that may be executed to provide particular services and/or functions on user device 110. Particular applications (apps 302a-302h) are described with respect to user device 110 for simplicity. In practice, there may be more/fewer and/or different applications implemented on, or in conjunction with, user device 110.

Apps 302a-302h may provide one or more services and may have one or more corresponding or associated usage activities (UAs) 304a-304f (collectively referred to as UAs 304 or individually as UA 304) (shown in FIG. 3 in association with user device 110). Apps 302a-302h may include a music app 302a (i.e., an audio playing application that may provide music services to user device 110, such as playing files in a particular digital audio format (e.g., songs in a Moving Pictures Expert Group Audio Layer III (MP3) format), a global positioning system (GPS) app 302b that may indicate a GPS position of user device 110, a book app 302c that may provide digital books that may be read on user device 110, a phone app 302d that may provide telephone services, including sending and receiving calls, on user device 110, an email app 302e that may provide email services, a game app 302f (that may provide video games), a camera app 302g that may provide camera services including taking or altering photos, and a calendar app 302h (that may provide a digital calendar)). Apps 302a-302h may be associated with a user account for user device 110. Apps 302a-302h are described for illustrative purposes, in practice, additional and/or different applications (not shown) may be implemented on user device 110, such as a text messaging application, an electronic commerce application, etc.

UAs 304a-304f are activities implemented by (or in association with) user device 110 based on input from (and/or observable by) a user of user device 110. UAs 304 performed in association with user device 110 may include listening to a particular song (song Act 304a), being at a particular location (GPS Act 304b), reading a particular book (read Act 304c), participating (i.e., receiving/placing) in a phone call to a particular number (call Act 304d), emailing to an email address (email Act 304e), taking a photo (photo Act 304f), texting to a phone number, etc. UAs 304 may occur at particular times, in association with particular content (e.g., a particular song for music app 302a, a particular phone number for phone app 302d, etc.). UAs 304 may include a user activity associated with multiple apps 302a-302h. For example, user device 110 may receive a phone call (act 304d) (via phone app 302d) at a particular location (identified via GPS app 302b).

There may be multiple occurrences of a particular type of UA 304 at different times associated with user device 110. Each occurrence of a UA 304 may be recorded and stored in association with information specific to the occurrence (e.g. the particular time, order of occurrence, etc.) and information based on the actual content that may be used by a user to identify the subject UA 304, such as a title of particular associated content for the subject UA 304 (e.g., an address located for GPS act 304b, particular book title for read act 304c, an email recipient for email act 304e, etc.), a value associated with that instance of the subject UA 304 (e.g., a distance travelled, a temperature, a video game score, etc.), and a constant (i.e., fixed value) associated with the subject UA 304 (e.g., a length of a movie, a number of pages in a book, etc.).

Figure 4:
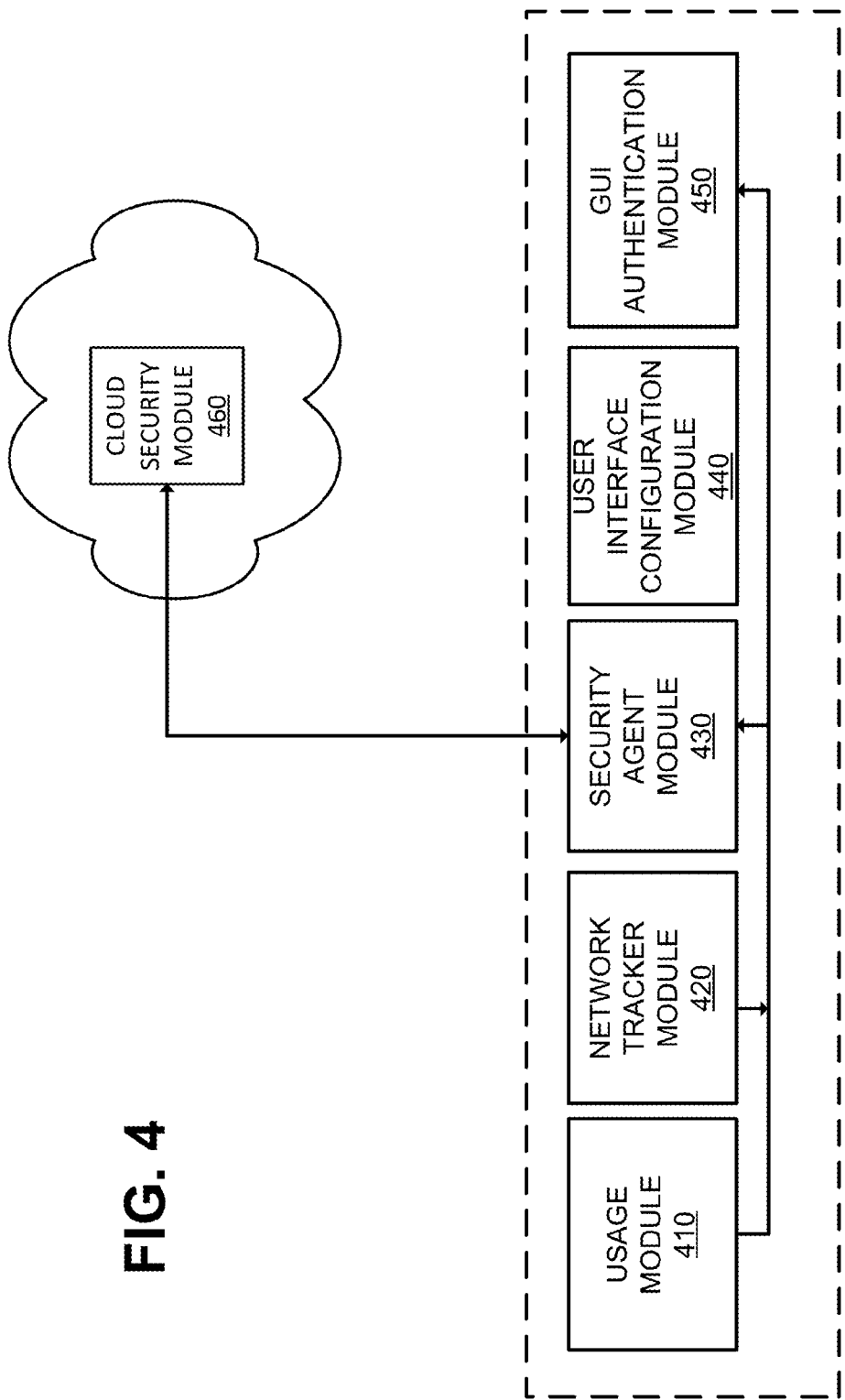
FIG. 4 is a diagram illustrating an exemplary system providing cloud based support for adaptive security associated with a user device.

FIG. 4 illustrates a functional block diagram of a system 400 for implementing cloud supported adaptive security for a user device, such as user device 110, in conjunction with a cloud based security device, such as cloud security device 155. As shown in FIG. 4, system 400 may include a usage module 410, a network tracker module 420, a security agent module 430, a user interface configuration module 440, a graphic user interface (GUI) authentication module 450, and a cloud security module 460.

Usage module 410 may track customer usage associated with apps 302a-302h, such as usage activities 304a-304f, on user device 110. For example, with respect to a particular occurrence of call Act 304d, usage module 410 may identify a last number dialed, a duration of the call, and/or last contact, etc.

Network tracker module 420 may track customer usage based on network activity associated with user device 110 in a network, such as a fiber-optic network, a 3G/4G network, etc. For example, network tracker module 420 may track data usage associated with user device 110 in the network, such as a last application downloaded, a location change, online purchases, etc. Network tracker module 420 may be implemented in user device 110 or in association with one or more network devices associated with network traffic for user device 110 in the network, such as a Wi-Fi terminal, optical network terminal (ONT), 3G/4G adapter, etc.

Security agent module 430 may receive indications of UAs 304a-304f performed on user device 110 and use that information to generate context based security questions or authentication challenges for users to access user device 110 (or particular applications on user device 110), e.g., unlock a touch screen on user device 110. Security agent module 430 may receive inputs from usage module 410 and/or network tracker module 420. Security agent module 430 may generate security challenge information, such as security questions and corresponding answers, based on particular (subject) UAs 304. The subject UAs 304 may be active UAs 304 (from the perspective of the user) that require direct input from the user of user device 110 or passive UAs 304 (from the perspective of the user), such as selecting particular applications or content, scheduling a meeting on a digital calendar, etc., which may be measured by user device 110 or devices associated with user device 110 without explicit input by the user (e.g., a device location determined by an associated GPS device, local temperature measured by an associated sensor, etc.). For example, security agent module 430 may determine a security question based on an occurrence of subject UAs 304a-304f. The security question may require a corresponding answer based on user knowledge of a UA 304 occurring within a predetermined time (e.g., the user may be required to provide an answer based on an activity occurring within a preceding week). Security agent module 430 may also store the security questions and corresponding required answers in an internal cache of user device 110, which may be updated at periodic intervals.

According to one implementation, security agent module 430 may generate security questions and required answers corresponding to different security levels. For example, security agent module 430 may generate security questions that implicitly or explicitly reference subject UAs 304. At a first security level, security agent module 430 may generate explicit security questions based on most recent UAs 304 and provide the required answer as one of multiple choices. For example, one security question may be: "which contact did you recently add to your phone": a) Max b) John c) Tom? At a second security level, security agent module 430 may generate implicit security questions based on UAs 304 while masking/hiding some of the information and providing a time range within which the UA 304 occurred. For example, another security question may be: "you recently made a call between 11:00 AM to 12:00 noon EST to a number ending with 9189, please enter the name of the call recipient to unlock the device".

Security agent module 430 may also generate security questions based on a preceding physical context of user device 110 (and, by association, the user). At a third security level, security agent module 430 may generate security questions based on context associated with the usage activity and user device 110 during a particular time. For example, if the user recently traveled to Washington D.C., security agent module 430 may generate a security question such as, "you recently visited one of these landmarks: a) Washington Monument b) Golden Gate Bridge c) Magic Kingdom, please enter a letter corresponding to the visited landmark. In another example, security agent module 430 may generate security questions based on an associated physical parameter measurable by a sensor associated with user device 110, e.g., temperature, motion, location, etc. For example, if the user recently went on a bicycle trip, security agent module 430 may provide the following question: "you recently took a trip of a) 10 miles, b) 20 miles or c) 40 miles."

Security agent module 430 may assign different security levels to access various networks and/or applications based on particular predetermined security settings associated with the particular network or application. For example, security agent module 430 may assign a first level of security, which includes security questions that explicitly reference subject UAs 304, to networks or applications that require a (relatively) reduced level of security and an enhanced level of security, which may combine implicit reference to subject UAs 304 and context associated with the usage activity and user device 110 during a particular time. For example, security agent module 430 may generate a security question such as, "you recently visited a landmark, please type the first three letters of the landmark." Security agent module 430 may assign the enhanced security level to applications or networks that include particularly private information, such as social security numbers, banking information, medical records, etc.

Security agent module 430 may determine security questions that require answers based on one or more of the occurrence of a particular subject UA 304, a constant associated with the subject UA 304 and a value associated with an occurrence of the subject UA 304. For example, security agent module 430 may identify a time that a particular subject UA 304 occurred as a required answer to the security question. In another example, security agent module 430 may identify a number (or an approximate number) of pages in a book as the answer to the security question.

User interface configuration module 440 may receive configuration parameters for the security questions and answers in user device 110. The configuration parameters may include input (from a user or administrative personnel associated with the user device 110) that may be used to determine a scope of the security questions and corresponding answers, such as categories of subject UAs 304 (e.g., read Act 304c), particular aspects associated with the UAs 304 (e.g., a last page read, a title, etc.), and a time range within which the subject UAs 304 are to be selected. With regard to the time range, the configuration parameters may indicate a number of preceding days over which UAs 304 may be selected to generate security questions based on usage. User interface configuration module 440 may save configuration parameters to a local database associated with user device 110 (i.e., on user device 110 or an associated device or memory structure).

GUI authentication module 450 may interact with user for authentication (i.e., provide information via a display associated with user device 110 and receive input from the user). GUI authentication module 450 may manage responses to user input received at a touch device interface of user device 110. GUI authentication module 450 may receive and present security questions from security agent module 430 or an associated database, such as cloud security device 155 or an internal cache of user device 110. GUI authentication module 450 may present the security questions in response to particular input received from the user (e.g., a touch input to user device 110, a shifting of a power switch (not shown) on user device 110, etc.).

According to one implementation, GUI authentication module 450 may provide a secondary security access process for user device 110. For example, GUI authentication module 450 may provide an interface for the user to input a request for a security code with which the user may unlock user device 110 after a predetermined number of incorrect responses to the adaptive security question. An associated device (not show) may dynamically generate a security code and provide the security code at a predetermined secondary access information interface, such as an email account provided by the user. The user may access user device 110 by inputting the security code.

Figure 5:
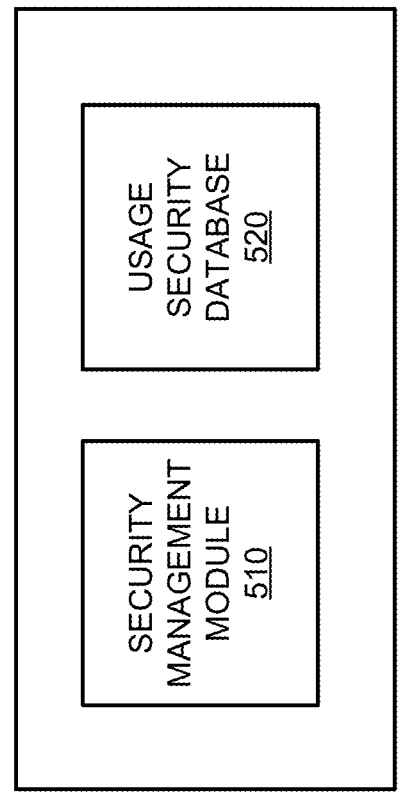
FIG. 5 is a diagram illustrating an exemplary security server.

FIG. 5 is a diagram of exemplary functional components of cloud security device 155. As shown in FIG. 5, cloud security device 155 may include a security management module 510 and a usage security database 520. The particular arrangement and number of components of cloud security device 155 as shown in FIG. 5 are illustrated for simplicity.

Security management module 510 may provide security management services for user devices 110 or alternatively to third-party networks, such as third-party networks described with respect to environment 600 and FIG. 6 below. Security management module 510 may receive security questions and corresponding answers associated with a user device 110, for example from user device 110. Alternatively, security management module 510 may receive particular customer usage data from user device 110 and determine security questions and corresponding answers for the user device 110, in a similar manner as described with respect to FIG. 4 and security agent module 430. Security management module 510 may encrypt and store security questions and corresponding answers in usage security database 520.

According to one implementation, security management module 510 may also provide authentication support for third-party networks based on customer usage data associated with a common user entity (e.g., a same user) for the user device 110 and an account provided by the third-party network, such as an account at an insurance agency, a 401K management company, etc., associated with the user (i.e., of which the user is a customer). Security management services may include authenticating a user associated with user device 110 for access to user device 110 or alternatively for access to the third-party network.

Usage security database 520 may store security questions and corresponding answers associated with user devices 110. Usage security database 520 may store security questions and corresponding answers in association with particular user accounts for third-party networks. For example, a user associated with user device 110 may also be a customer of a third-party organization. The third-party organization may allow access to accounts or other information in the third-party network, such as shown in FIG. 6 below, based on security management services provided via cloud security device 155.

Figure 6:
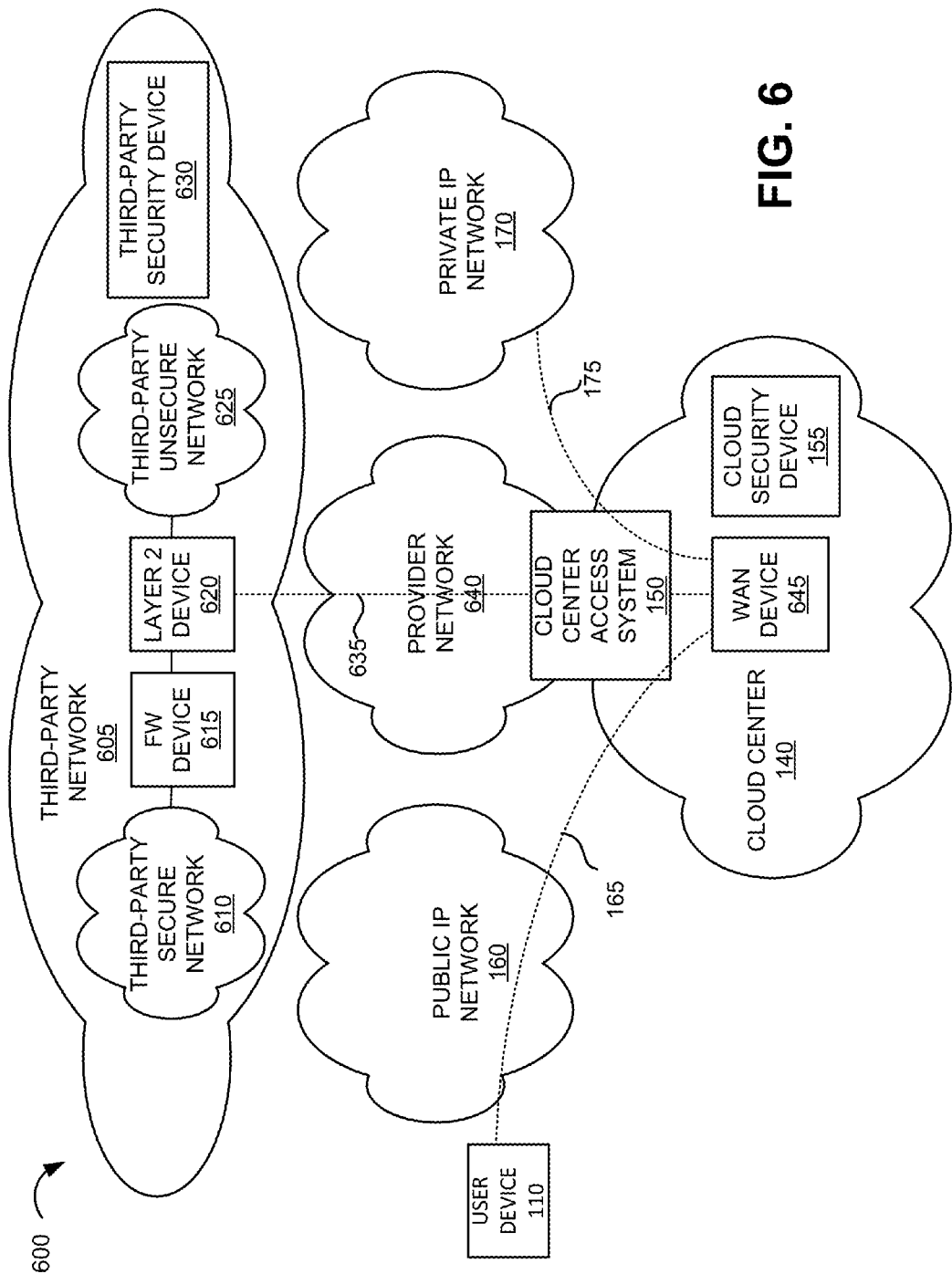
FIG. 6 is a diagram illustrating a second exemplary environment according to an implementation described herein.

FIG. 6 is a diagram of an environment 600 in which the systems and/or methods described herein may be implemented. Environment 600 illustrates an implementation in which security management services for a third-party network is provided via a cloud based system. As shown in FIG. 6, environment 600 may include user device 110, cloud center 140, cloud center access system 150, public IP network 160, and private IP network 170, which function similarly as described with respect to FIG. 1 and environment 100. Additionally, environment 600 may include a third-party network 605 and devices that support a third-party network 605, such as a provider network 640, and a WAN device 645. While FIG. 6 shows a single third-party network 605, a single provider network 640, a single cloud center 140, a single cloud center access system 150, a single public IP network 160, and a single private IP network 170 for illustrative purposes, in practice, environment 600 may include multiple third-party networks 605, multiple provider networks 640, multiple cloud centers 140, multiple cloud center access systems 150, multiple public IP network 160, or multiple private IP networks 170.

Third-party network 605 may include a LAN (and or WAN) associated with a particular third-party organization. For example, third-party network may be a medical network, an insurance network, a financial network, a work-related network, etc. Third-party network 605 may include a third-party secure network 610, a firewall (FW) device 615, a Layer 2 device 620, a third-party unsecure network 625, and a third-party security device 630.

Third-party secure network 610 may include a Layer 2 network, such as an Ethernet LAN, that is secured by FW device 615. Firewall device 615 may include a Layer 2 device that performs firewall functions for third-party secure network 610.

Layer 2 device 620 may include any device capable of processing and forwarding data at the data link layer. For example, Layer 2 device 620 may include a switch, a multi-port bridge, a Layer 2 firewall, or another type of Layer 2 device. Layer 2 device 620 may receive a data unit at a particular input port, may determine a particular output port for the data unit, and may forward the data unit via the output port.

Third-party unsecure network 625 may include a Layer 2 network that is not protected by firewall device 615. For example, third-party unsecure network 625 may include a demilitarized zone (DMZ) that includes public server devices that may be accessed over public IP network 160.

Third-party security device 630 may provide security management services in conjunction with cloud security device 155. Third-party security device 630 may receive security questions and corresponding answers from cloud security device 155. Third-party security device 630 may provide access to secure information (e.g., medical records, financial information, insurance information, etc., associated with the user) on third-party network 605 based on the user inputting responses to security questions.

Cloud center 140 may include a WAN device 645. While FIG. 6 illustrates a single WAN device 645 for illustrative purposes, in practice, cloud center 140 may include multiple WAN devices 645. WAN device 645 may include one or more devices that provide one or more services for a customer's (i.e., a third-party's) WAN. For example, WAN device 645 may generate a virtual Layer 3 device for each third-party network 605 associated with a particular third-party organization. Thus, if a third-party organization owns ten different third-party networks 605, WAN device 645 may include ten virtual Layer 3 devices. Each virtual Layer 3 device may function as a Layer 3 edge router for a particular third-party network 605. Furthermore, a particular virtual Layer 3 device may provide one or more of threat management services, WAN optimization services, and/or wireless LAN management services.

Cloud center 140 may include a cloud security device 155. While FIG. 6 illustrates a single cloud security device 155 for illustrative purposes, in practice, cloud center 140 may include multiple cloud security devices 155. Cloud security device 155 may include one or more devices that provide one or more security services for user devices 110. For example, cloud security device 155 may form a repository for adaptive security information associated with user device 110, as described above with respect to FIG. 5 and usage security database 520 and may manage security processes at third-party network 605, as described above with respect to FIG. 5 and security management module 510.

Provider network 640 may include a Layer 2 network, such as an Ethernet network, that may provide a Layer 2 connection between Layer 2 device 620 and cloud center access system 150 via Layer 2 connection 635.

Figure 7:
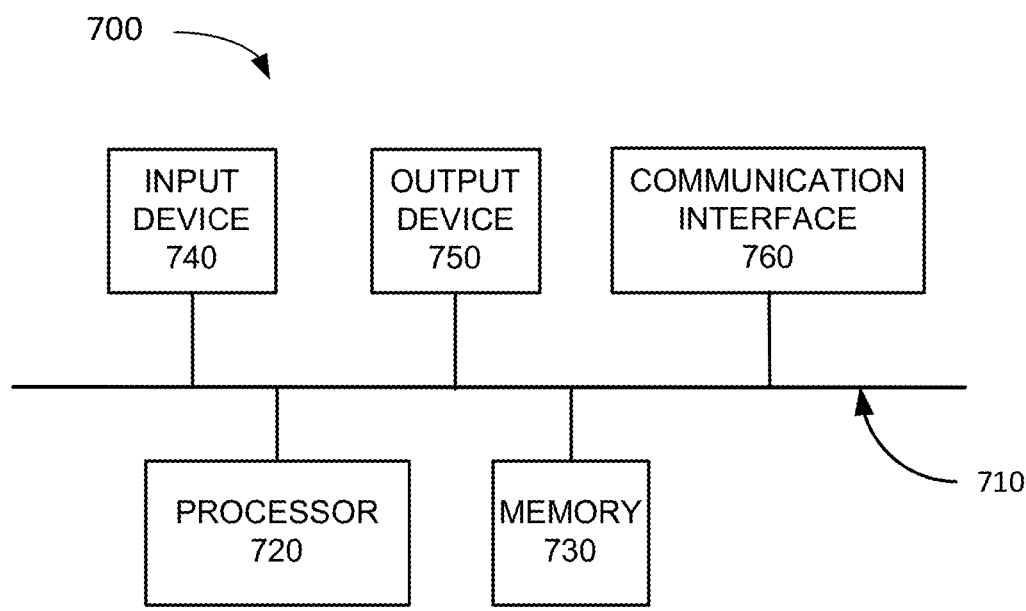
FIG. 7 is a diagram illustrating exemplary components of a device that may be included in one or more components of FIGS. 1 to 6.

FIG. 7 is a diagram of exemplary components of a device 700 that may correspond to devices implementing any one of devices described with respect to FIGS. 1-6, such as user devices 110, cloud center 140, cloud center access system 150, cloud security device 155, public IP network 160, private IP network 170, FW device 615, layer 2 device 620, third-party security device 630, and WAN device 645. Each of the devices (or systems) may include one or more devices 700. As shown in FIG. 7, device 700 may include a bus 710, a processor 720, a memory 730, an input device 740, an output device 750, and a communication interface 760.

Bus 710 may permit communication among the components of device 700. Processor 720 may include one or more processors or microprocessors that interpret and execute instructions. In other implementations, processor 720 may be implemented as or include one or more application specific integrated circuits (ASICs), field programmable gate arrays (FPGAs), or the like.

Memory 730 may include a random access memory (RAM) or another type of dynamic storage device that stores information and instructions for execution by processor 720, a read only memory (ROM) or another type of static storage device that stores static information and instructions for the processor 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, one or more biometric mechanisms, and the like. Output device 750 may include a device that outputs information to the operator, such as a display, a speaker, etc.

Communication interface 760 may include a transceiver that enables device 700 to communicate with other devices and/or systems. For example, communication interface 760 may include mechanisms for communicating with other devices, such as other devices of environments 100 or 600.

As described herein, device 700 may perform certain operations in response to processor 720 executing machine-readable instructions contained in a computer-readable medium, such as memory 730. A computer-readable medium may include a non-transitory memory device. A memory device may include space within a single physical memory device or spread across multiple physical memory devices. The machine-readable instructions may be read into memory 730 from another computer-readable medium or from another device via communication interface 760. The machine-readable instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and machine-readable instructions.

Although FIG. 7 shows exemplary components of device 700, in other implementations, device 700 may include fewer components, different components, differently arranged components, or additional components than those depicted in FIG. 7. As an example, in some implementations, input device 740 and/or output device 750 may not be implemented in device 700. In these situations, device 700 may be a "headless" device that does not explicitly include an input or an output device. Alternatively, or additionally, one or more components of device 700 may perform one or more other tasks described as being performed by one or more other components of device 700.

Figure 8:
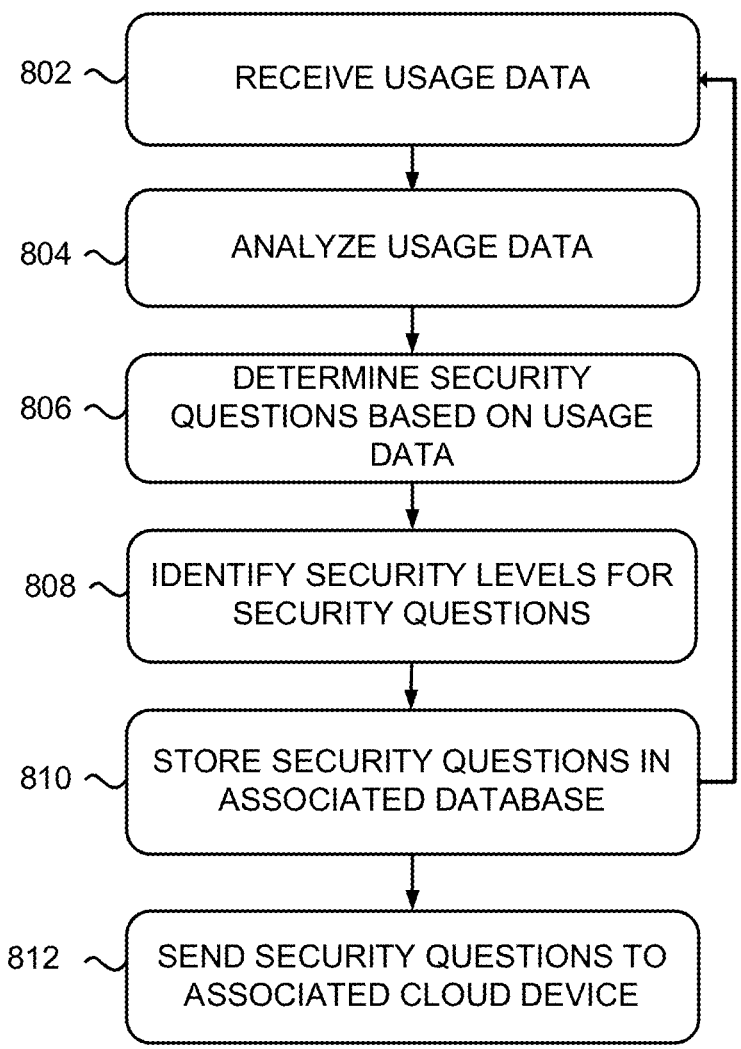
FIG. 8 is a flowchart of an exemplary process for providing adaptive security in association with a user device according to an implementation described herein.

FIG. 8 is a flowchart of an exemplary process for providing adaptive security management of a user device according to an implementation described herein. In one implementation, the process of FIG. 8 may be performed by user device 110. In other implementations, some or all of the process of FIG. 8 may be performed by another device or a group of devices separate from user device 110 and/or including user device 110.

As shown in FIG. 8, user device 110 may receive usage data (block 802). For example, user device 110 may receive usage data when the user performs particular activities using user device 110, such as UAs 304$a$-304$f$. Usage data may include each occurrence of UAs 304 and associated times, content and other information specific to the particular occurrence of the UA 304. User device 110 may store usage data based on occurrences of UAs 304 for a predetermined time in an associated database (e.g., user device 110 may store UAs 304 received over a predetermined time span, such as a preceding week).

According to one implementation, usage data may include active UAs 304 or passive UAs 304 (from the perspective of the user). According to another implementation, usage data may particular physical context of user device 110. For example, sensors associated with user device 110 may measure a location, motion, temperature, etc., associated with user device 110 at a particular time. Usage data may combine active UAs 304 or passive UAs 304, such as a location when a particular application was downloaded.

User device 110 may analyze the usage data based on predetermined criteria, such as a time of occurrence of the UA (e.g., a last UA 304, an order of occurrence of UAs 304, a time span of the UA 304 (i.e., a particular time span during which the UA 304 occurred (e.g. between 10 AM and 11 AM)). User device 110 may also analyze UAs 304 based on associated physical context associated with the UAs 304 (e.g. a location when a particular UA 304 is received).

User device 110 may determine security questions based on the analyzed usage data (block 806). For example, user device 110 may determine security questions that require the user to input information based on a last occurrence of a particular type of UA 304 (e.g., a name, number, time, location, etc., associated with a last phone call), or associated physical context associated with particular UAs 304. User device 110 may determine the security questions based on predetermined formats that correspond to particular security levels. For example, user device 110 may determine some security questions that include explicit reference to the subject UAs 304 (e.g., security questions that reference the subject UA 304 as a prospective answer among multiple choices), and other security questions that do not include the subject UAs 304 (e.g., security questions that require the user to recall and input a particular activity without an explicit prompt, such as an activity in a particular time span).

User device 110 may identify security questions based on predetermined security levels (block 808). For example, user device 110 may identify security questions based on security levels associated with the different security questions. For example, user device 110 may identify the security level associated with security questions that include explicit reference to the subject UAs 304 as a first security level, and additional security levels based on the whether the security questions include implicit reference to the subject UAs 304 or is based on physical context of user device 110 (e.g., how many miles has the user traveled in a particular time, locations that the user has visited, etc.).

User device 110 may store the security questions and corresponding security levels in an associated database (block 810).

User device 110 may send the security questions to an associated cloud device, such as cloud security device 155, for example at a network location associated with cloud security device 155. Cloud security device 155 may perform security management procedures for a third-party network associated with a user of user device 110, such as described below with respect to FIG. 9 and process 900. Alternatively, user device 110 may send usage data to cloud security device 155 and cloud security device 155 may determine security questions associated with user device 110.

User device 110 may refresh the security questions in the database associated with user device 100 (and sent to cloud security device 155) as new usage data is received in association with user device 110. User device 110 may also refresh the security questions based on time windows associated with the security questions (e.g., a number of calls within a last 48 hours may change as time passes).

Figure 9:
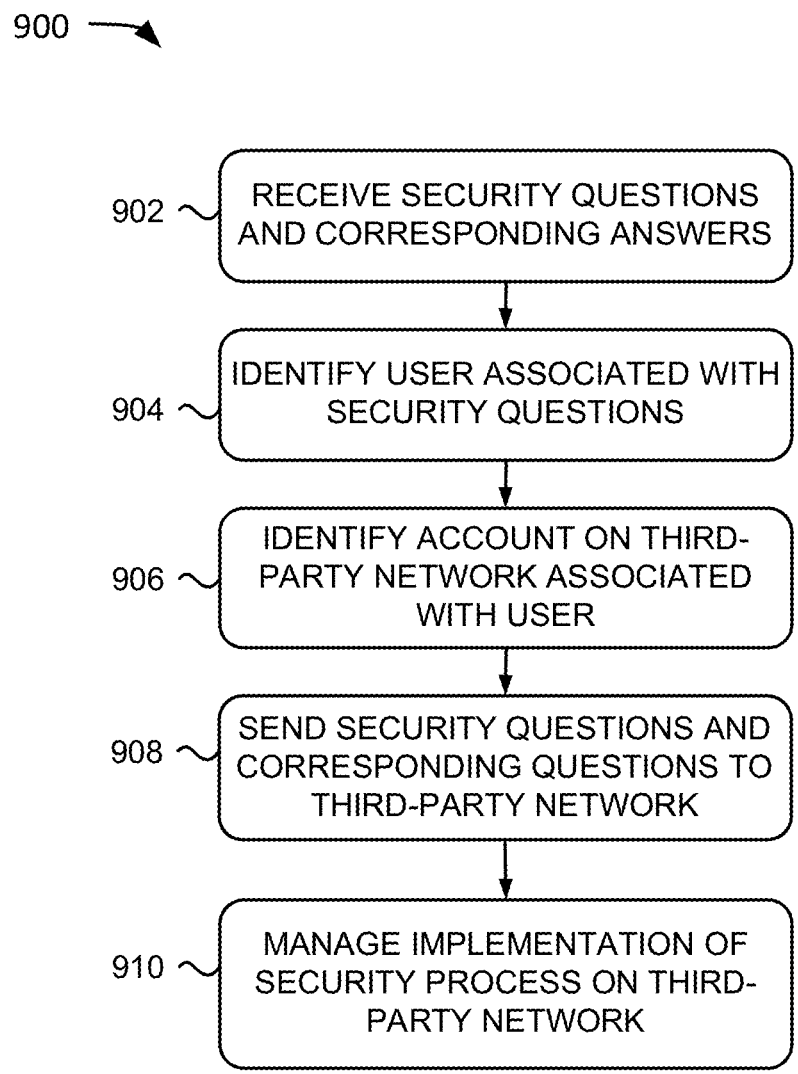
FIG. 9 is a flowchart of an exemplary process for providing adaptive security in association with a user device according to an implementation described herein.

FIG. 9 is a flowchart of an exemplary process for managing security in a third-party network based on usage activity associated with a user device, according to an implementation described herein. In one implementation, the process of FIG. 9 may be performed by cloud security device 155. In other implementations, some or all of the process of FIG. 9 may be performed by another device or a group of devices separate from cloud security device 155 and/or including cloud security device 155.

The process of FIG. 9 may include receiving security questions and corresponding answers associated with user device 110 (block 902). For example, user devices 110 may send usage data and other information identifying an associated user at predetermined intervals and/or at the occurrence of particular vents. The information indicating the associated user may be a unique identifier corresponding to the user.

Cloud security device 155 may identify the user associated with particular security questions and corresponding answers and user device 110 (block 904). For example, cloud security device 155 may compare the unique identifier with a database of unique identifiers associated with users for user devices 110.

Cloud security device 155 may identify additional accounts on third-party networks associated with the user (block 906).

At block 908, cloud security device 155 may send security questions to a third-party network associated with the user of user device 110, such as third-party network 605. Cloud security device 155 may send security questions and corresponding answers to third-party security device 630.

Cloud security device 155 may also manage the implementation of security processes on third-party network 605 in association with third-party security device 630 (block 910). For example, cloud security device 155 may interact with third-party security device 630 to provide a user interface with which the user may be presented security questions. The user may gain access to an account on third-party network 605 by inputting the requested information (i.e., a correct answer to the security question).

Figure 10:
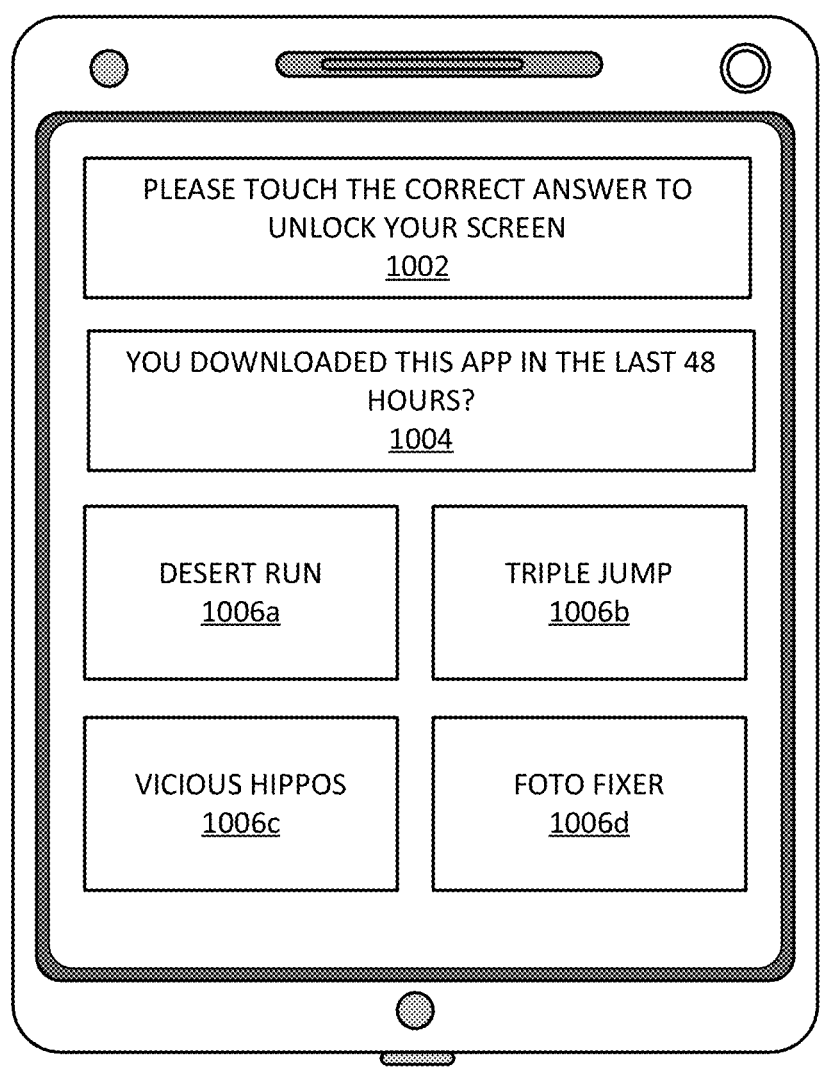
FIG. 10 is a diagram illustrating an exemplary implementation of adaptive security for access to a user device.

FIG. 10 is a diagram showing an implementation of adaptive security questions for security on user device 110. As shown in FIG. 10, user device 110 may provide an instruction to the user to provide a particular response (1002, "please touch the correct answer to unlock your screen") in response to a security question (1004, "you downloaded this app in the last 48 hours?"). User device 110 may also display a number of choices 1006a-1006d (e.g., names of possible applications the user may have downloaded in the last 48 hours, such as desert run 1006a, triple jump 1006b, vicious hippos 1006c, and foto fixer 1006d) of responses to the security question. If the user touches the correct answer, user device 110 may unlock the touch screen. If the user inputs an incorrect answer, user device 110 may provide a different security question or require the user to obtain access to user device 110 using a secondary ("back-up") procedure.

Although a multiple choice format for the security question is shown, other types of security questions may be implemented on user device 110. For example, the user may be required to input alphanumeric characters (e.g., a number, a name, etc.) in response to the security question.

Systems and/or methods described herein may implement centralized cloud based authentication application. Security questions presented to the user are adaptive and may also be context sensitive. Although security questions have been described with respect to particular applications and physical context, it should be understood that the systems and methods may be applied to user observable changes associated with user devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:

accessing, at a user device, usage data associated with the user device, wherein the usage data includes information based on at least one usage activity associated with one or more applications on the user device;

analyzing, by the user device, the usage data based on predetermined criteria;

determining, by the user device, a security question and a corresponding answer based on the usage data;

storing the security question and the corresponding answer in a database;

receiving a request for the security question and the corresponding answer from at least one device associated with at least one network location, wherein the at least one network location includes a cloud device associated with a third-party network;

providing the security question and the corresponding answer to the at least one device in response to the request for the security question and the corresponding answer, wherein the cloud device is configured to provide access to the third-party network based on the security question and the corresponding answer; and providing access to the user device based on an input of the corresponding answer via a user interface of the user device in response to the security question.

2. The computer-implemented method of claim 1, wherein determining the security question and the corresponding answer based on the usage data further comprises:

identifying a particular occurrence of a subject usage activity; and determining the security question based on one or more of an occurrence of the subject usage activity, a constant associated with the subject usage activity or a value associated with the occurrence of the subject usage activity.

3. The computer-implemented method of claim 1, further comprising:

identifying a predetermined security level for the security question; and providing the security question based on the predetermined security level.

4. The computer-implemented method of claim 1, wherein providing the security question further comprises:

providing the security question based on a physical context associated with the user device.

5. The computer-implemented method of claim 1, wherein accessing usage data associated with the user device further comprises:

accessing passive usage data associated with the user device, wherein the passive usage data is associated with values measured by the user device without direct user input.

6. The computer-implemented method of claim 1, wherein the one or more applications on the user device include an audio playing application, a global positioning system (GPS) application, a digital book application, a phone application, a text messaging application, or a digital camera application.

7. The computer-implemented method of claim 1, wherein the at least one usage activity includes listening to a song, being at a location, reading a book, participating in a phone call, or taking a digital photograph.

8. The computer-implemented method of claim 1, wherein analyzing the usage data based on predetermined criteria further comprises:

analyzing the usage data based on an occurrence of the usage activity including one or more of an order of occurrence, a time span of the usage activity, or a number of occurrences.

9. The computer-implemented method of claim 1, wherein analyzing the usage data based on predetermined criteria further comprises:

analyzing the usage data based on a constant associated with the usage activity including one or more of a title, a value, a name, a place, content, or a subject associated with the usage activity.

10. The computer-implemented method of claim 1, wherein accessing usage data associated with the user device further comprises:

accessing at least one of network usage data associated with the user device, or application usage data associated with the user device.

11. The computer-implemented method of claim 1, wherein the at least one usage activity comprises usage activities received within a predetermined time span.

12. The computer-implemented method of claim 1, wherein accessing usage data associated with the user device further comprises:

accessing active usage data associated with the user device, wherein the active usage data is associated with direct user input to the user device.

13. A user device comprising:

a memory to store a plurality of instructions; and a processor configured to execute instructions in the memory to:

access usage data associated with the user device, wherein the usage data includes information based on at least one usage activity associated with one or more applications on the user device;

analyze the usage data associated with the user device based on predetermined criteria;

determine security questions and corresponding answers based on the usage data associated with the user device;

receive a request for the security questions and the corresponding answers from at least one device associated with at least one network location, wherein the network location includes a cloud device associated with a third-party network;

send the security questions to the network location, wherein the cloud device is configured to provide access to the third-party network based on the security questions and the corresponding answers; and provide access to the user device via a touch screen interface based on an input of a corresponding answer in response to one of the security questions.

14. The user device of claim 13, wherein the processor is further configured to:

identify a particular occurrence of a subject usage activity; and determine the security questions based on one or more of an occurrence of the subject usage activity, a constant associated with the subject usage activity or a value associated with the occurrence of the subject usage activity.

15. The user device of claim 13, wherein the processor is further configured to:

identify a predetermined security level for the security questions; and provide the security questions based on the predetermined security level.

16. The user device of claim 15, wherein, when providing the security questions based on a predetermined security level, the processor is further configured to:

provide each of the security questions based on one or more of a physical context associated with the security question, an explicit reference to a subject usage activity in the security questions, or an implicit reference to the subject usage activity in the security questions.

17. The user device of claim 13, wherein the processor is further configured to:

analyze the usage data based on a constant associated with the usage activity including one or more of a title, a value, a name, a place, content, or a subject associated with the usage activity.

18. A non-transitory computer-readable medium including instructions to be executed by a processor, the instructions including one or more instructions, when executed by the processor, for causing the processor to:

access, at a user device, usage data associated with the user device, wherein the usage data includes information based on at least one usage activity associated with one or more applications on the user device;

analyze, by the user device, the usage data based on predetermined criteria;

determine, by the user device, a security question and a corresponding answer based on the usage data;

store the security question and the corresponding answer in a database;

receive a request for the security question and the corresponding answer from at least one device associated with at least one network location, wherein the at least one network location includes a cloud device associated with a third-party network;

provide the security question and the corresponding answer to the at least one device in response to the request for the security question and the corresponding answer, wherein the cloud device is configured to provide access to the third-party network based on the security question and the corresponding answer; and provide access to the user device via a touch screen interface based on an input of the corresponding answer by a user in response to the security question.

19. The user device of claim 13, wherein, when accessing usage data, the processor is further configured to:

receive one or more of passive usage data associated with the user device and active usage data associated with the user device, wherein the active usage data is associated with direct user input to the user device and the passive usage data is associated with values measured by the user device.

20. The user device of claim 13, wherein the at least one usage activity includes listening to a song, being at a location, reading a book, participating in a phone call, emailing, or taking a digital photograph.

* * * * *